(12) United States Patent
Kitano et al.

(10) Patent No.: US 10,572,273 B2
(45) Date of Patent: Feb. 25, 2020

(54) SYSTEM CHANGE ASSISTANCE SYSTEM, INFORMATION PROCESSING DEVICE, AND SYSTEM CHANGE ASSISTANCE METHOD AND PROGRAM

(71) Applicant: NEC Corporation, Minato-ku, Tokyo (JP)

(72) Inventors: Atsushi Kitano, Tokyo (JP); Takayuki Kuroda, Tokyo (JP); Manabu Nakanoya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

(21) Appl. No.: 15/754,339

(22) PCT Filed: Jul. 13, 2016

(86) PCT No.: PCT/JP2016/003313
§ 371 (c)(1),
(2) Date: Feb. 22, 2018

(87) PCT Pub. No.: WO2017/033389
PCT Pub. Date: Mar. 2, 2017

(65) Prior Publication Data
US 2018/0239619 A1 Aug. 23, 2018

(30) Foreign Application Priority Data

Aug. 27, 2015 (JP) .................. 2015-167796

(51) Int. Cl.
G06F 9/44 (2018.01)
G06F 9/445 (2018.01)
G06F 7/02 (2006.01)

(52) U.S. Cl.
CPC ............ *G06F 9/44505* (2013.01); *G06F 7/02* (2013.01)

(58) Field of Classification Search
CPC ................................ G06F 7/02; G06F 9/44505
See application file for complete search history.

(56) References Cited

U.S. PATENT DOCUMENTS

| | | | |
|---|---|---|---|
| 2011/0010587 A1 | 1/2011 | Kikuchi | |
| 2014/0068053 A1* | 3/2014 | Ravi | G06F 9/5072 709/224 |
| 2016/0299771 A1* | 10/2016 | Navarro | G06F 17/50 |

FOREIGN PATENT DOCUMENTS

| | | |
|---|---|---|
| JP | 2001-255973 A | 9/2001 |
| JP | 2009-098958 A | 5/2009 |

(Continued)

OTHER PUBLICATIONS

S. Hagen et al., "Model-based planning for state-related chains to infrastructure and software as a service instances in large data centers", in Cloud Computing (CLOUD), 2010 IEEE 3rd International Conference on, Jul. 2010, p. 11-18.

(Continued)

*Primary Examiner* — Albert Wang

(57) ABSTRACT

A system change assistance system includes value redefinition means 501 configured to compare two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and to change the value of the first item of the first comparison subject vector in a case where the value of the first item of each vector is matched and the value of the second item of each vector is different.

9 Claims, 14 Drawing Sheets

(56) References Cited

FOREIGN PATENT DOCUMENTS

| JP | 2011-227789 A | 11/2011 |
| WO | 2009/118900 A1 | 10/2009 |
| WO | 2011/046559 A1 | 4/2011 |

OTHER PUBLICATIONS

International Search Report for PCT Application No. PCT/JP2016/003313, dated Oct. 4, 2016.

* cited by examiner

FIG. 4

```
1.  {
2.    "STATE ELEMENT TYPE" :{
3.      "TYPE NAME" : "E",
4.      "POSSIBLE STATE" :[ "s1" , "s2" , "s' 1" , "s' 2" ],
5.      "REINTERPRETATION" :[
6.        {
7.          "id" : "r1"
8.          "from" : "s1"
9.          "to" : "s' 1"
10.         "PROCESSING" : "task1"
11.       },
12.       {
13.         "id" : "r2"
14.         "from" : "s2"
15.         "to" : "s' 2"
16.         "PROCESSING" : "task2"
17.       },
18.     ],
19.     "CHANGE ITEM" :[
20.     {"ITEM NAME" : "para1" }
21.     ],
22.     "STATE TRANSITION" :[
23.       {
24.         "id" : "t1"
25.         "from" : "s1"
26.         "to" : "s2"
27.         "PROCESSING" : "task3"
28.       },
29.       {
30.         "id" : "t2"
31.         "from" : "s2"
32.         "to" : "s1"
33.         "PROCESSING" : "task4"
34.       },
35.       {
36.         "id" : "t3"
37.         "from" : "s' 1"
38.         "to" : "s1"
39.         "PROCESSING" : "task5 para1={para1}"
40.       },
41.       {
42.         "id" : "t4"
43.         "from" : "s' 2"
44.         "to" : "s2"
45.         "PROCESSING" : "task6 para1={para1}"
46.       },
47.       {
48.         "id" : "t5"
49.         "from" : "s' 1"
50.         "to" : "s2"
51.         "PROCESSING" : "task7 para1={para1}"
52.       },
53.       {
54.         "id" : "t6"
55.         "from" : "s' 2"
56.         "to" : "s1"
57.         "PROCESSING" : "task8 para1={para1}"
58.       },
59.     ]
60.   }
61. }
```

FIG. 5

```
1.  {
2.    "STATE ELEMENT" :{
3.      "TYPE NAME" : "E" ,
4.      "id" : "e1" ,
5.      "STATE" : "s1" ,
6.      "CHANGE ITEM" :{
7.        "para1" : "p1"
8.      }
9.    }
10. }
```

FIG. 6

```
1.  {
2.    "CHANGE REQUEST" :{
3.      "TYPE NAME" : "E" ,
4.      "id" : "e1" ,
5.      "CURRENT STATE" : "s1" ,
6.      "REQUEST STATE" : "s2" ,
7.      "CHANGE ITEM" :{
8.        "para1" : "p1"
9.      }
10.   }
11. }
```

FIG. 8

```
1.  {
2.    "STATE ELEMENT TYPE" :{
3.      "TYPE NAME" : "Apache",
4.      "POSSIBLE STATE" : [ "F", "T", "U" ],
5.      "REINTERPRETATION" : [
6.        {
7.          "id" : "r1"
8.          "from" : "T",
9.          "to" : "U",
10.         "PROCESSING" : "noop"
11.       }
12.     ],
13.     "CHANGE ITEM" :[
14.       { "ITEM NAME" : "port" }
15.     ],
16.     "STATE TRANSITION" :[
17.       {
18.         "id" : "t1"
19.         "from" : "F",
20.         "to" : "T",
21.         "PROCESSING" : "service apache2 state=start"
22.       },
23.       {
24.         "id" : "t2"
25.         "from" : "T",
26.         "to" : "F",
27.         "PROCESSING" : "service apache2 state=stop"
28.       },
29.       {
30.         "id" : "t3"
31.         "from" : "U",
32.         "to" : "F",
33.         "PROCESSING" : "service apache2 state=stop"
34.       },
35.       {
36.         "id" : "t4"
37.         "from" : "U",
38.         "to" : "T",
39.         "PROCESSING" : "service apache2 state=reload port={port}"
40.       }
41.     ]
42.   }
43. }
```

```
1.  {
2.    "STATE ELEMENT" :{
3.      "TYPE NAME" : "Apache" ,
4.      "id" : "apache1" ,
5.      "STATE" : "T" ,
6.      "CHANGE ITEM" :{
7.        "port" : "80"
8.      }
9.    }
10. }
```

```
1.  {
2.    "STATE ELEMENT" :{
3.      "TYPE NAME" : "Apache" ,
4.      "id" : "apache1" ,
5.      "STATE" : "T" ,
6.      "CHANGE ITEM" :{
7.        "port" : "81"
8.      }
9.    }
10. }
```

```
1.  {
2.    "CHANGE REQUEST" :{
3.      "TYPE NAME" : "Apache" ,
4.      "id" : "apache1" ,
5.      "CURRENT STATE" : "F" ,
6.      "REQUEST STATE" : "T" ,
7.      "CHANGE ITEM" :{
8.        "port" : "81"
9.      }
10.   }
11. }
```

```
1.  {
2.    "STATE ELEMENT" :{
3.      "TYPE NAME" : "Apache" ,
4.      "id" : "apache1" ,
5.      "STATE" : "U" ,
6.      "CHANGE ITEM" :{
7.        "port" : "81"
8.      }
9.    }
10. }
```

FIG. 19

```
1.  {
2.    "STATE ELEMENT TYPE" :{
3.      "TYPE NAME" : "E" ,
4.      "POSSIBLE STATE" : [ "s1" , "s2" , "s" ],
5.      "REINTERPRETATION" : [
6.        {
7.          "id" : "r"
8.          "from" : "*" ,
9.          "to" : "s" ,
10.         "PROCESSING" : "task1"
11.       }
12.     ],
13.     "CHANGE ITEM" :[
14.       { "ITEM NAME" : "para1" }
15.     ],
16.     "STATE TRANSITION" :[
17.       {
18.         "id" : "t1"
19.         "from" : "s1" ,
20.         "to" : "s2" ,
21.         "PROCESSING" : "task2"
22.       },
23.       {
24.         "id" : "t2"
25.         "from" : "s2" ,
26.         "to" : "s1" ,
27.         "PROCESSING" : "task3"
28.       },
29.       {
30.         "id" : "t3"
31.         "from" : "s" ,
32.         "to" : "s1" ,
33.         "PROCESSING" : "task4 para1={para1}"
34.       },
35.       {
36.         "id" : "t4"
37.         "from" : "s" ,
38.         "to" : "s2" ,
39.         "PROCESSING" : "task4 para1={para1}"
40.       }
41.     ]
42.   }
43. }
```

SYSTEM CHANGE ASSISTANCE SYSTEM, INFORMATION PROCESSING DEVICE, AND SYSTEM CHANGE ASSISTANCE METHOD AND PROGRAM

This application is a National Stage Entry of PCT/JP2016/003313 filed on Jul. 13, 2016, which claims priority from Japanese Patent Application 2015-167796 filed on Aug. 27, 2015 the contents of all of which are incorporated herein by reference, in their entirety.

TECHNICAL FIELD

The present invention relates to a system change assistance system, an information processing device, a system change assistance method, and a system change assistance program for assisting change of a system.

BACKGROUND ART

Generally, change of a system is conducted in such a manner that an administrator of the system creates a procedure manual to change states of components that configure the system to a requested state, and a change operator executes change operations according to the procedure manual. To correctly complete all the change operation, the change operations need to be executed in the correct order. The order of the change operations varies depending on the characteristics and combination of the components (hereinafter referred to as system components or simply components) that configure the system. Therefore, to correctly describe the procedure manual, deep understanding of the system and components is necessary, and a high level of expertise and enormous time are required.

There is a technique for formally expressing requirements regarding a change procedure for changing a state of a component according to state elements and a dependency relationship between the state elements. Here, the state element is an information group keeping information regarding a state of a predetermined object such as a certain system component and a method of changing the state all together. An example of the state element includes an identifier (hereinafter referred to as "id") for identifying the state element, possible states, executable state transitions among the available states, a current state, and a request state, for an object. Note that the id of the state element can also be used as an id for identifying an object having information regarding the state of the state element and a method of changing the state.

FIG. 22 is a conceptual diagram of a certain state element "e". In FIG. 22, "e" represents an id of the state element. Further, "s1" and "s2" represent states possibly taken by an object in the state element. "t1" and "t2" represent executable state transitions between the states possibly taken by the object in the state element. Further, "s1" represents a current state, and "s2" represents a request state.

In the present specification, as illustrated in FIG. 22, the entire state element is represented by a rectangle with rounded corners. Further, each of the possible states is represented by an ellipse. Further, the executable state transition is represented by a solid arrow between states. Further, the current state is represented by a double-line ellipse. Further, the request state is represented by a black ellipse. The state element illustrated in FIG. 22 can be regarded as expressing a change request for changing the target "e" from the state "s1" to the state "s2". Note that, by use of a change procedure generation system of generating a change procedure on the basis of the state element expressing such a change request, the change procedure including necessary operations from the state element to the state transition "t1" can be derived.

In a case of changing any one of a plurality of objects in a cooperative relationship, a correct change procedure can be derived by defining a dependency relation between state elements of the objects.

FIG. 23 is a diagram illustrating an expression example of a change requirement of a system based on a plurality of state elements. In FIG. 23, the change requirement of the system necessary for starting middleware (MW) is expressed using two state elements. For example, the object system includes a virtual machine (VM) and middleware (MW) installed in the VM. An id of the state element targeting the VM is "VM" and an id of the state element targeting MW is "MW". In state elements "VM" and "MW", a state "F" represents a stop state, and a state "T" represents an operation state. As illustrated in FIG. 23, the transition from the state "F" to the state "T" in the VM is performed via start processing "boot" of the VM. Further, the transition from the state "T" to the state "F" in the VM is performed via stop processing "stop" of the VM. Further, the transition from the state "F" to the state "T" in the MW is performed via start processing "start" of a service of the MW. Further, the transition from the state "T" to the state "F" in the MW is performed via stop processing "stop" of a service of the MW.

Here, the MW is installed on the VM, and therefore the VM needs to be started in order to start or stop the service of the MW. Therefore, it can be seen that a procedure of performing a state transition of the MW while the VM is in the stop state is an error. To define constraint conditions for such change, in FIG. 23, dependency of the state element "VM" on the state "T" is defined for the state transition "start" and the state transition "stop" of the state element "MW".

By use of the above-described change procedure generation system, the change procedure for changing the state of the desired object from the current state to the request state can be derived while such dependency is satisfied. In the example of FIG. 23, a procedure of changing the state of the VM from "F" to "T" and then changing the state of the MW from "F" to "T" is derived. More specifically, a change procedure of conducting the start ("boot") of the VM, which is state transition processing for changing the state of the VM from "F" to "T", and then conducting the start ("start") of the MW, which is state transition processing for changing the state of the MW from "F" to "T", is automatically derived.

A method of deriving a change procedure of a system based on state elements as described above is disclosed, for example, in NPL 1.

CITATION LIST

Non-Patent Literature

NPL 1: S. Hagen and A. Kemper, "Model-based planning for state-related chains to infrastructure and software as a service instances in largedata centers", in Cloud Computing (CLOUD), 2010 IEEE 3rd International Conference on, July 2010, p. 11-18.

SUMMARY OF INVENTION

Technical Problem

However, the above-described technique of deriving a change procedure derives a state transition on the basis of state change, that is, a difference between the current state and the request state, and derives the change procedure on the basis of the derived state transition. Therefore, there is a problem that an expected change procedure may not be able to be derived for a change request of a system in which only setting values are different.

For example, assuming that, in the above example of the state element "e", the state before change is "s1" and the value of a certain setting item at that time is "p1". Even if a change request for changing the value of this setting item to "p2" is performed while the state remains "s1", the states before and after the change are both "s1", and thus a state transition is not derived, and a desired change procedure is also not derived. Here, the desired change procedure is a procedure including processing such as "reloading of setting information", for example.

Hereinafter, derivation of a change procedure based on state elements regarding additional setting in a component of such a system will be discussed using a specific example. For example, "Apache" that is one of web server software can change a port number for accepting a request to any number such as 80 or 8080. Therefore, even in a function to derive a change procedure of a system based on state elements, a control function to start Apache, using a specific port number specified by the administrator of the system is required.

To realize such a control function, for example, a mechanism to further include information of a setting value to a state element, and derive content of necessary processing according to a state transition indicated by the state element corresponding to the setting value is conceivable. For example, a port number is included in the state element corresponding to Apache as the setting value, in addition to the two states of the start ("T") and the stop ("F"). Then, "processing of starting Apache with the specified port number" is associated with a state transition from the state "F" to the state "T". With such a mechanism, for example, after temporarily specifying "F" as the request state of Apache, the administrator of the system specifies "T" as the request state again together with information of a new port number, so that processing of starting Apache with the new port number can be automatically derived. However, the method of temporarily requesting the stop state is undesirable because unnecessary stop processing is executed although only reload processing is required.

Note that, in a case of not temporarily specifying "F", the state before change is "T" and the state after change is also "T", and thus a state transition is not derived by the above method.

To avoid this problem, for example, a method of expressing all variations of values (setting values) that can be taken by a specified setting item as a possible state is conceivable. FIG. 24 is a diagram illustrating an example of a state element in which a set of a possible state that can be actually taken and a setting value is defined as a possible state that can be taken by an object (hereinafter may be referred to as element state).

A component targeted by the state element "e" in FIG. 24 has "s1" and "s2" as originally possible states. Also, the component has "p1" and "p2" as the setting values. In such a case, four states of a state "s1, p1", a state "s1, p2", a state "s2, p1", and a state "s2, p2" are defined as the element states. With the definition, the difference between the setting values is treated in a similar manner to the difference between the states, and even in the case of the change request in which only the setting values are different, the state transition can be recognized from the state "s1, p1" to the state "s1, p2", and the processing such as "reloading of setting values" associated with the state transition can be derived.

However, the setting values are typically continuous values, and variations of possible values are huge. For example, in the example of Apache, an arbitrary integer from 0 to 65535 can be selected as the port number. Therefore, in the method of defining a set of a state and a setting value as a new state in the state element, a huge number of element states needs to be defined, and practical use is very difficult.

Therefore, an objective of the present invention is to provide a system change assistance system, an information processing device, a system change assistance method, and a system change assistance program capable of correctly performing processing even for a change request in which only a value of an item having a change possibility is different.

Solution to Problem

A system change assistance system according to the present invention includes value redefinition means configured to compare two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and configured to compare the two vectors, and to change the value of the first item of the first comparison subject vector in a case where the value of the first item of each vector is matched and the value of the second item of each vector is different.

An information processing device according to the present invention includes value redefinition means configured to compare two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and to change the value of the first item of the first comparison subject vector in a case where the value of the first item of each vector is matched and the value of the second item of each vector is different.

A system change assistance method according to the present invention includes, by an information processing device, comparing two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and changing the value of the first item of the first comparison subject vector in a case where the value of the first item of each vector is matched and the value of the second item of each vector is different.

A system change assistance program according to the present invention causes a computer to execute processing of comparing two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and changing the value of the first item of the first comparison subject vector in a case where the value of the first item of each vector is matched and the value of the second item of each vector is different.

Advantageous Effects of Invention

According to the present invention, even a change request in which only a value of an item having a change possibility is different can be correctly processed.

BRIEF DESCRIPTION OF DRAWINGS

FIG. 4 It depicts a diagram illustrating an example of a state element definition in a text format.

FIG. 5 It depicts a diagram illustrating an example of a current state element in a text format.

FIG. 6 It depicts a diagram illustrating an example of an instruction state element in a text format.

FIG. 8 It depicts a diagram illustrating an example of a state element definition in a text format having Apache as an object component.

FIG. 19 It depicts a diagram illustrating the state element in FIG. 18 in a text format.

DESCRIPTION OF EMBODIMENTS

Figure 1:
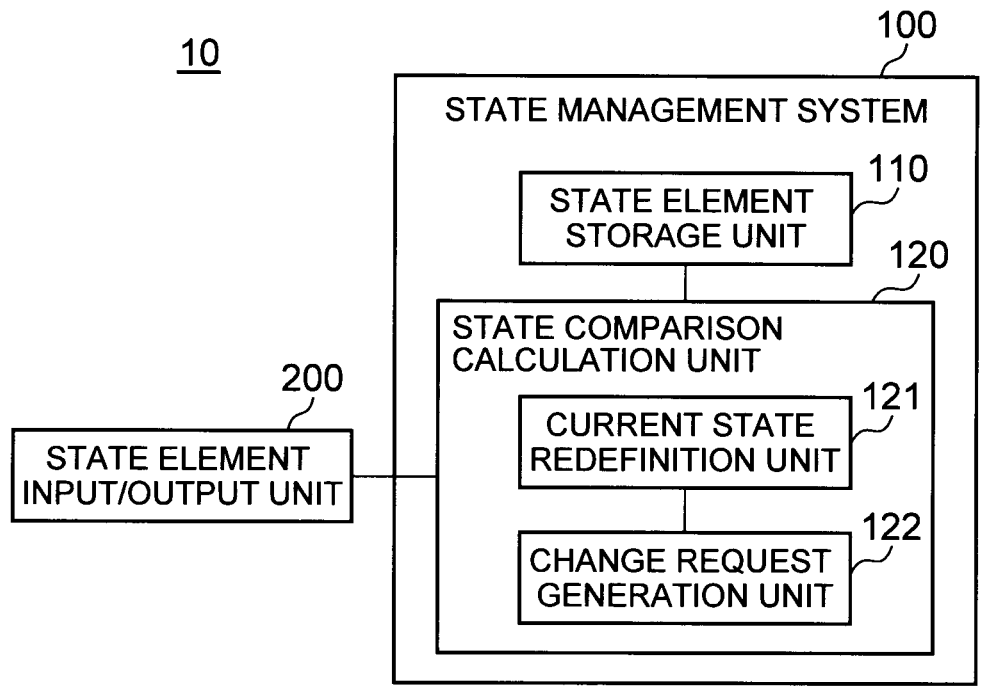
FIG. 1 It depicts a block diagram illustrating a configuration example of a system change assistance system according to a first exemplary embodiment.

Hereinafter, an exemplary embodiment of the present invention will be described with reference to the drawings. FIG. 1 is a block diagram illustrating a configuration example according to a first exemplary embodiment. As illustrated in FIG. 1, a system change assistance system 10 of the present exemplary embodiment includes a state management system 100 and a state element input/output unit 200.

Further, the state management system 100 includes a state element storage unit 110 and a state comparison calculation unit 120. The state comparison calculation unit 120 is connected with the state element input/output unit 200 directly or indirectly via a network. Note that the state comparison calculation unit 120 and the state element input/output unit 200 may just be communicatively connected.

Further, the state comparison calculation unit 120 includes a current state redefinition unit 121 and a change request generation unit 122.

In the present exemplary embodiment, the state element storage unit 110 is realized by, for example, a storage device. Further, the state comparison calculation unit 120 (more specifically, the current state redefinition unit 121 and the change request generation unit 122) is realized by, for example, a CPU or the like operated according to a program.

The state element storage unit 110 stores at least a part of information elements included in a state element of an object, targeting a set of a component that is an object for change in an object system, and an arbitrary item holding a value that is related to the component and has a change possibility (hereinafter the item is referred to as change item) as the object. Here, the change possibility is not necessarily limited to meaning that a value can be directly changed from the outside. That is, the meaning includes a case in which the value automatically varies in the system in conjunction with some kind of event. The information elements of a state element stored in the state element storage unit 110 may be an identifier of the state element (the identifier is also an identifier of an object indicated by the state element), and possible states, executable state transitions between the states, and a current state, regarding the object. Note that the state element storage unit 110 may hold information putting together only fixed information elements, of the information elements of the state element, as state element definition, or may further hold the current state in association with the identifier of the corresponding state element.

A state element is typically configured from information defined in three different phases. That is, the state possibly taken by the object and the executable state transition are fixed information determined according to the characteristics of the object, and are not changed unless the specification of the object is changed. Therefore, the fixed information may just be defined in generating the state element of the object. On the other hand, the current state and the request state are information elements changed in accordance with a situation of a system component as an object or a request by an administrator. Note that the request state is defined at the time of change request by the administrator of the system or the like. Further, the current state is continuously managed while updated as change arises, such as changed according to the situation of the system component and changed according to execution of a change operation. Therefore, it is easier to manage the information by dividing and holding the information having different phases to be defined, and it is efficient in processing.

In the present exemplary embodiment, the state element is divided into the state element definition including the fixed information, information indicating the current state, and information indicating the request state. Then, the state element to be passed to a change procedure generation system is generated by synthesizing the above-described three pieces of information. Hereinafter, information indicating the current state as the state element may be referred to as "current state element" in some cases. Further, information indicating the request state as the state element may be referred to as "request state element" in some cases. Further, the state element to be passed to the change procedure generation system may be referred to as "instruction state element" in some cases.

Figure 2:
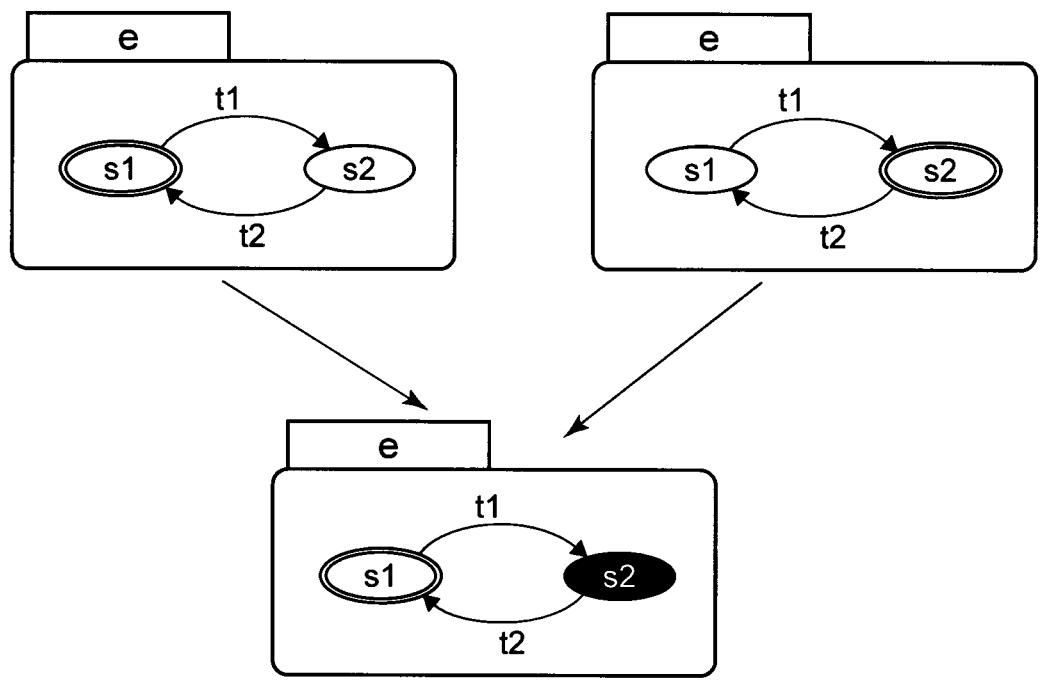
FIG. 2 It depicts a diagram illustrating a concept of processing of generating an instruction state element.

FIG. 2 is a conceptual diagram of processing of generating the instruction state element. The upper left part in FIG. 2 illustrates the state element (current state element) representing a state before change of an object of the state element. Further, the upper right part in FIG. 2 represents the state element (request state element) representing a state after change of the object. Further, the lower part in FIG. 2 illustrates the state element (instruction state element) representing a change request to the change procedure generation system. As illustrated in FIG. 2, in a case where the state before change is "s1" and the state after change is "s2", the instruction state element may just include "s1" as the current state and "s2" as the request state, in addition to the information of the possible state and the state transition. Note that the possible state is not a required element in the instruction state element, and for example, definition of the current state, the request state, and the state transition between the current state and the request state may be sufficient.

In the present exemplary embodiment, the current state element may be information including the id of the object and a set of the current state and the change item as information for discriminating a current element state. Further, the request state element may be information including the id of the object and a set of a state after change and the change item as information for discriminating the request state, that is, a state after change. Further, the instruction state element may be information including the id of the object, the current element state, and the element state after change. In the present exemplary embodiment, in a case of referring to "object" of the state element, the object refers to an object having information regarding a state included in the state element and a method of changing the state. More specifically, the object refers to an object identified by a set of a normal state of a component and an arbitrary change item.

The state comparison calculation unit 120 generates an instruction state element on the basis of the information (the state element definition and the current state element) stored in the state element storage unit 110 and the request state element received from the state element input/output unit 200. Note that details of processing in the state comparison calculation unit 120 will be described below.

The state element input/output unit 200 inputs and outputs the state element. The state element input/output unit 200 receives the state element definition defined by a user or another device, the current state element generated by a state system (not illustrated) that manages a state of an object system, and the request state element defined by the user or the state system, and outputs the instruction state element generated by the state management system 100.

In the present exemplary embodiment, the state management system 100 compares the state elements before and after the state change, that is, the current state element and the request state element, and generates an instruction state element.

The state element definition in the present exemplary embodiment includes the information regarding the id, the element states possibly taken by the object, the transitions between the element states, and the change item as the object. Further, the instruction state element includes the information regarding the id, the current element state of the object, the element state after a request, and processing regarding the state transition. Note that, in a case of referring to "element state", the element state refers to a normal state and a state caused by reinterpretation described below with no distinction.

Here, the state transition of the present exemplary embodiment includes a transition caused by the change request and a transition caused by reinterpretation of the current state. In the case of a transition between element states, both of the above transitions are referred to without distinction.

Figure 3:
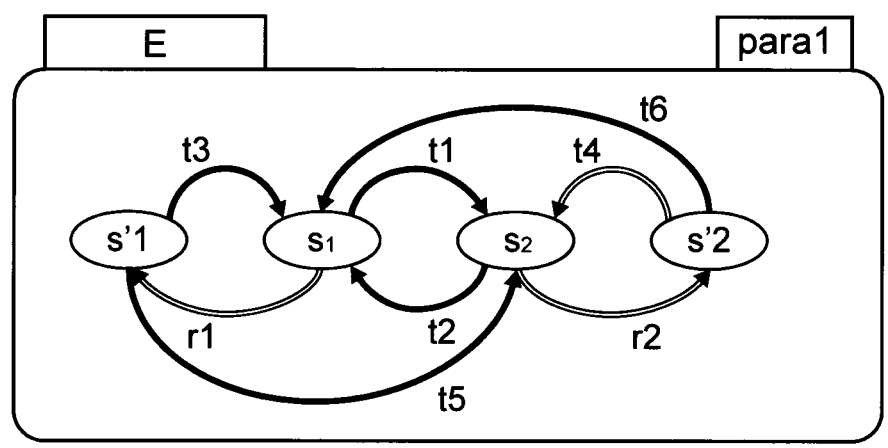
FIG. 3 It depicts a diagram illustrating an example of a state element definition.

FIG. 3 is a diagram illustrating an example of state element definition. As described above, the state element definition is an information group including the information fixedly determined according to characteristics of an object, of the state element. In FIG. 3, the state element defined by the state element definition is represented by a rectangle with rounded corners. The rectangle located at the upper left corner of the rectangle with rounded corners represents an id of the state element definition, that is, the id of the object. In addition, the rectangle located on the upper right corner of the rectangle with rounded corners represents a change item (in this example, the name of the change item) corresponding to the object. Further, the elliptical shape within the rectangle with rounded corners represents the element state possibly taken by the object. Further, the solid arrow represents a transition between the element states caused by a change request. Further, the double arrow represents a transition between the element states caused by reinterpretation of the current element state. Note that, in this example, in a case where the normal state is "s1", the state caused by reinterpretation is expressed as "s'1" with "'" added.

According to FIG. 3, it can be seen that the object "e" has "para1" as an object change item and has "s1" and "s2" as the possibly taken (normal) state. In addition, "s'1" and "s'2" are defined as reinterpretation states of "s1" and "s2" which are normal states. Therefore, it can be seen that the object "e" has four states of "s1", "s2", "s'1", and "s'2" as the element states.

As transitions between element states, "t1" representing the transition from "s1" to "s2", "t2" representing the transition from "s2" to "s1", "t3" representing the transition from "s'1" to "s1", "t4" representing the transition from "s'2" to "s2", "t5" representing the transition from "s'1" to "s2", "t6" representing the transition from "s'2" to "s1", "r1" representing the transition from "s1" to "s'1", and "r2" representing the transition from "s2" to "s'2" are defined. In this example, a transition "tX" (where X=1 to 6) corresponds to the transition by the change request and a transition "rX" (where X=1 to 2) corresponds to the transition caused by the reinterpretation. Note that the transitions from a normal state to a state after reinterpretation corresponding to the normal state (for example, the transition from "s1" to "s'1" and the like) are transitions caused by reinterpretation, and all other transitions (for example, a transition from a normal state to a normal state, a transition from a state after reinterpretation corresponding to a certain normal state to another normal state, and the like) are transitions by the change request.

Further, FIG. 4 is a diagram expressing the state element definition illustrated in FIG. 3 in a text format. Here, an example using a JSON format is illustrated. In FIG. 4, a "state element type" item indicates that the text is text information of the information element definition. In this example, the "state element type" item further includes five items of "type name", "possible state", "reinterpretation", "change item", and "state transition".

Here, "type name" represents the name as the id of the state element definition. Note that, in the present exemplary embodiment, the id of the state element definition includes the meaning as the id of the object of the state element definition. Further, the "possible state" represents possible state(s) by the object of the state element definition. Here, the possible state by the object of the state element definition corresponds to the above element state. That is, the state caused by reinterpretation is also included. Note that, in the "possible state" item, an identifier of the element state may be defined, as illustrated in FIG. 4.

Further, the "reinterpretation" represents information regarding a state caused by reinterpretation with respect to a normal state group. The "reinterpretation" item of this example further has four items of "id", "from", "to", and "processing". The "id" represents an identifier of a state transition to a state caused by the reinterpretation. The "from" represents a current state (normal state) of the object before reinterpretation. The "to" represents a current state (reinterpreted state) of the object to be transferred after reinterpretation. The "processing" represents a transition condition, that is, transition processing, which is performed when a current state of the object is transitioned from a state indicated by "from" to a state indicated by "to" by reinterpretation. Note that, in the "process" item, an identifier of a state transition associated with the transition processing may be defined. Here, for example, from the 6th to 11th lines in FIG. 4 indicate that, in a case where a transition of a state by reinterpretation is determined when a current state of the object before reinterpretation is "s1", processing "task1" associated with the state transition "r1" is executed, and the current state of the object is transitioned to "s'1". Likewise, from the 12th to 17th lines indicate that, in a case where a transition of a state by reinterpretation is determined when the current state of the object before reinterpretation is "s2", processing "task2" associated with the state transition "r2" is executed, and the current state of the object is transitioned to "s'2".

Further, the "change item" in the "state element type" item represents a change item corresponding to the state element definition. That is, the "change item" represents the change item, of the set of a state and a change item targeted by the state element definition. The "change item" item in this example has "item name", and in this "item name", the name of the change item and the like are defined.

Further, the "state transition" represents a transition between states by a change request. The "state transition" item in this example has items of "id", "from", "to", and "processing", and these items are basically similar to those in the "reinterpretation" item described above. That is, the "id" represents an identifier of the state transition, the "from" represents a state of a transition source, the "to" represents a state of a transition destination, the "processing" represents a transition condition, that is, transition processing, which is performed when a current state of the object is transitioned from a state indicated by "from" to a state indicated by "to" by a change request. Here, in the transition processing as a transition condition, information necessary for executing processing is described or a reference to the information is described. Examples of the information necessary for executing processing include a normal state of the object, and a set of a normal state and a change item of the object.

For example, in 23rd to 58th lines in FIG. 4, six state transitions are defined. For example, from the 23rd to 28th lines indicate that, in a case where a state is transitioned to "s2" by a change request when a current state of the object before the change request is "s1", processing "task3" associated with the state transition "t1" is executed, and the current state of the object is transitioned to "s2". Likewise, from the 29th to 34th lines indicate that, in a case where a state is transitioned to "s1" when the current state of the object before a change request is "s2", processing "task4" associated with the state transition "t2" is executed, and the current state of the object is transitioned to "s2". As a summary of the following lines, the state transition "t3" substitutes the value of the setting item in the request state into the setting item "para1" and transitions the state from "s'1" to "s1" by "task5". Here, "{item name}" represents reference to the item name indicated by the change request.

Note that, in this example, the setting items defined during processing is the change items. However, items other than the change items can be defined.

The state transition "t4" substitutes the value of the setting item in the request state into the setting item "para1" and transitions the state from "s'2" to "s2" by "task6". The state transition "t5" substitutes the value of the setting item in the current state into the setting item "para1" and transitions the state from "s'1" to "s2" by "task7". The state transition "t6" substitutes the value of the setting item in the current state into the setting item "para1" and transitions the state from "s'2" to "s1" by "task8".

Further, FIG. 5 is a diagram illustrating an example of a current state element. Note that, in FIG. 5, an example of the current state element corresponding to the state element definition illustrated in FIG. 4 is illustrated in a text format. Here, an example using a JSON format is illustrated. In FIG. 5, the "state element" item indicates that the text is text data of the current state element. In this example, the "state element" item further includes four items of "type name", "id", "state", and "change item".

Here, the "type name" represents the name of the corresponding state element definition. Further, the "id" represents the name as the id of the state element. Note that the name of the state element is assumed to be used as a name of a state element when the state element including a current state is defined on the basis of the information. The "state" represents a current normal state of the object. The "change item" represents a current change item of the object. In the "change item" of this example, an item name and a value of the item name are defined.

According to FIG. 5, for example, it can be seen that the state element of an object "E" having the current state managed with the id "e1" is in a current state "s1", and a current value of the change item "para1" is "p1". Note that if there are parameters necessary for state transition processing, the parameters can be defined here, in addition to the above items, for example.

Further, FIG. 6 is a diagram illustrating an example of the instruction state elements. Note that FIG. 6 illustrates an example of the instruction state element corresponding to the state element definition illustrated in FIG. 4 in a text format. Here, an example using a JSON format is illustrated. In FIG. 6, the "change request" item represents that the text is text data of the instruction state element. In this example, the "change request" item further includes five items of "type name", "id", "current state", "request state", and "change item".

Here, the "type name" represents the name of the corresponding state element definition. Further, the "id" represents the name as the id of the state element. Note that the name of the state element is assumed to be used as a name of a state element when the state element (instruction state element) including a current state and a change state is defined on the basis of the information. The "current state" represents a current normal state of the object. The "request state" represents a normal state requested to the object, that is, a normal state of the object after the state change. The "change item" represents a change item in the request state of the object. In the "change item" of this example, an item name and a value of the item name are defined.

According to FIG. 6, for example, it can be seen that the state element of the object "E" having the set of the current state and the request state managed with the id "e1" is transitioned from the normal state "s1" to the normal state "s2", and the value of the change item "para1" after the state change becomes "p1". Note that if there are parameters necessary for state transition processing, the parameters can be defined here, in addition to the above items, for example.

Hereinafter, a process of deriving the instruction state element of the present exemplary embodiment will be described using the above example of Apache. Note that a change procedure desired to derive is a procedure consisting of a change requirement "change the value of the change item and perform reload". In the present exemplary embodiment, derivation of such a change procedure is realized by reinterpretation of current state by comparison in the set of the state and the change item, more specifically, by a state transition to the reinterpreted state of the current state based on a comparison result.

Figure 7:
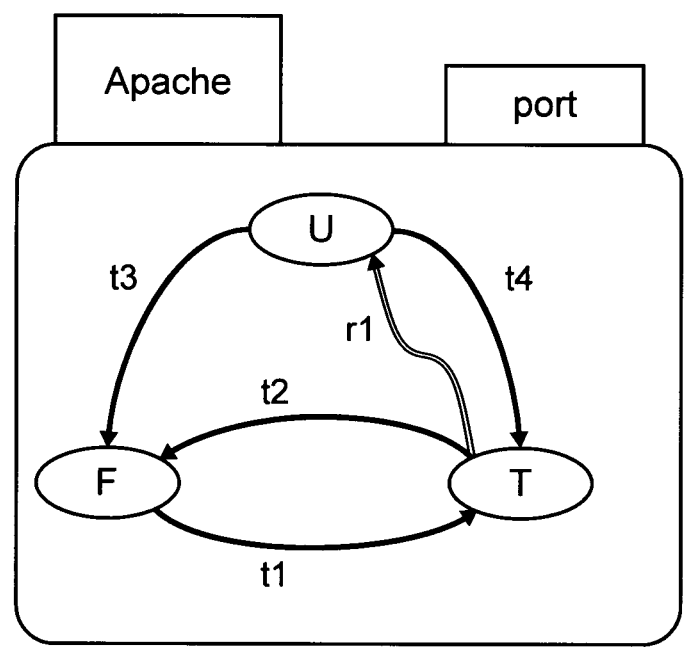
FIG. 7 It depicts a diagram illustrating an example of a state element definition having Apache as an object component.

FIG. 7 is a diagram illustrating an example of the state element definition having Apache as an object component in the present exemplary embodiment. Here, a state "F" represents a state in which Apache is stopped. Further, a state "T" represents a state in which Apache is in operation. Further, a state "U" represents a state in which Apache is in operation with a value different from the value of the change item in the request state. In this example, the state "F" and the state "T" are in the normal state and the state "U" is in the reinterpreted state of the state "T".

Further, in FIG. 7, a transition "t1" from the state "F" to the state "T" is defined. Further, a transition "t2" from the state "T" to the state "F" is defined. Further, a transition "t3" from the state "U" to the state "F" is defined. Further, a transition "t4" from the state "U" to the state "T" is defined.

Further, a transition "r1" from the state "T" to the state "U" is defined. In this example, a transition "tX" (where X=1 to 4) is a transition by a change request. Further, the transition "r1" is a transition caused by reinterpretation. Further, the upper right square of the rectangle with rounded corners of the state element indicates that "port" (port number) is used as a change item of the state element.

FIG. 8 is a diagram expressing the state element definition illustrated in FIG. 7 in a text format. Here, an example using a JSON format is illustrated. Note that the data structure of this example is basically similar to the example illustrated in FIG. 4.

The reload processing of Apache is executed by changing the setting value of Apache in operation and issuing a reload execution command to Apache. Therefore, reinterpretation of the current state is necessary when the current states are in operation before and after the state change and the setting values are different. In the state element definition illustrated in FIGS. 7 and 8, the reinterpreted state "U" is defined for the state "T" on the basis of such an operation of the object component. The reason why the reinterpreted state is not defined for the state "F" is also based on the operation of the object component. Note that an operation is not particularly necessary for Apache at the time of transition from the current state "T" to the reinterpreted state "U", and thus "noop" defined as a value not to execute processing is set to the processing of the state transition "r1" caused by reinterpretation.

The state comparison calculation unit 120 of the present exemplary embodiment virtually changes the current state to the reinterpreted state in a case where the reinterpreted state is defined for the current state when the change request is received, and in a case where the value of the change item is different before and after the state change, on the basis of the state element definition. This may be to redefine the state before the state change as the reinterpreted state.

In this example, as a state transition processing of the state transition "t1", activation processing (see "service apache2 state=start" in the 21st line in the drawing) for transitioning Apache from the stop state to the operation state is defined. Here, "service apache2" indicates that the object to be executed in the processing is Apache. In addition, "state=start" indicates that the object to be executed in the processing (Apache) is operated to the operation state.

Further, in this example, as state transition processing of the state transition "t2", stop processing (see "service apache2 state=stop" in the 27th line in the drawing) for transitioning Apache from the operation state to the stop state is defined. Here, "state=stop" indicates that the object to be executed in the processing (Apache) is operated to the stop state.

Further, in this example, as state transition processing of the state transition "t3", stop processing (see the 33rd line in the drawing) for transitioning Apache from a state of being operated with a setting value different from the requested setting value to the stop state is defined.

Further, in this example, as state transition processing of the state transition "t4", reload processing (see "service apache2 state=reload port={port}" in the 39th line in the drawing) for transitioning Apache from a state of being operated with a setting value different from the requested setting value to a state operated with the requested setting value is defined. Here, "state=reload" indicates that a setting value reload operation is performed. Further, "port={port}" indicates that the value of the item in "{ }" indicated by the change request is substituted for to the item indicated by the left side.

The above definition method is merely an example, and the definition method is not limited thereto.

Figures 9, 10:
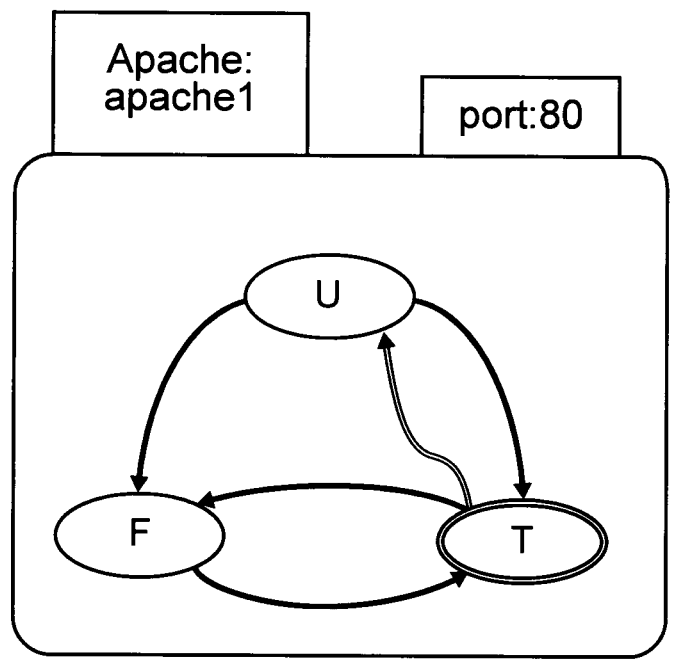
FIG. 9 It depicts a diagram illustrating an example of a current state element having Apache as an object component.
FIG. 10 It depicts a diagram illustrating an example of a current state element in text format having Apache as an object component.

Further, FIG. 9 is a diagram illustrating an example of a current state element having Apache as an object component. Note that the example illustrated in FIG. 9 illustrates current content (the current normal state and the value of the change item in this state) for the object indicated by the state element definition illustrated in FIG. 7. According to FIG. 9, it can be seen that the state is a state element managed with the id "apache1", the state before the state change is "T", and the value of the change item "port" before the state change is "80".

Further, FIG. 10 is a diagram expressing the current state element illustrated in FIG. 9 in a text format. Here, an example using JSON is illustrated. Note that the data structure of this example is basically similar to the example illustrated in FIG. 5.

Figures 11, 12:
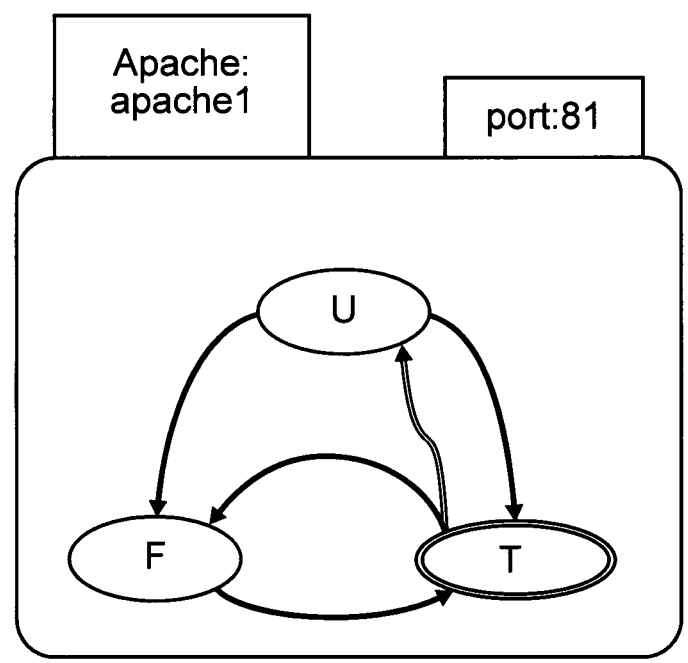
FIG. 11 It depicts a diagram illustrating an example of a current state element after a change request, having Apache as an object component.
FIG. 12 It depicts a diagram illustrating an example of a current state element after a change request in text format having Apache as an object component.

Further, FIG. 11 is a diagram illustrating another example of a current state element having Apache as an object component. Note that the example illustrated in FIG. 11 illustrates content after request (the normal state after request and the value of the change item in this state) as content of the current state, for the object indicated by the state element definition illustrated in FIG. 7. According to FIG. 11, it can be seen that the state is a state element managed with the id "apache1", the state after the state change is "T", and the value of the change item "port" after the state change is "81". As in this example, the current state element having the state after request as the current state can be used in place of the request state element. Note that in that case, the present state in the current state is the request state.

Further, FIG. 12 is a diagram expressing the current state element illustrated in FIG. 11 in a text format. Here, an example using JSON is illustrated. Note that the data structure of this example is basically similar to the example illustrated in FIG. 5.

Figures 13, 14:
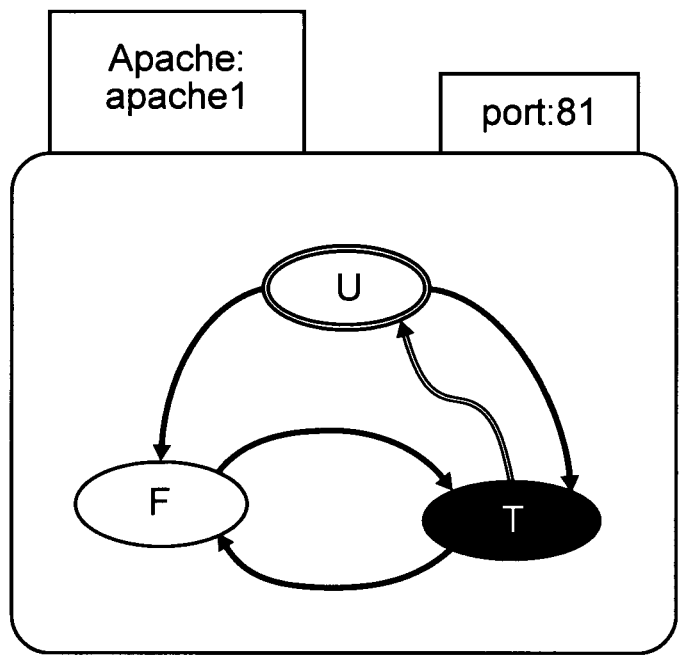
FIG. 13 It depicts a diagram illustrating an example of an instruction state element having Apache as an object component.
FIG. 14 It depicts a diagram illustrating an example of an instruction state element of Apache in a text format.

FIG. 13 is a diagram illustrating an example of an instruction state element having Apache as an object component. The example illustrated in FIG. 13 is an example of the instruction state element derived on the basis of the state element definition illustrated in FIG. 7, the current state element illustrated in FIG. 9, and the current state element after change request illustrated in FIG. 11. According to FIG. 13, it can be seen that the state is a state element managed with the id "apache1", the state before the state change is "U", the request state is "T", and the value of the change item "port" after the state change is "81".

Further, FIG. 14 is a diagram expressing the instruction state element illustrated in FIG. 13 in a text format. Here, an example using JSON is illustrated. Note that the data structure of this example is basically similar to the example illustrated in FIG. 6.

The current state redefinition unit 121 of the state comparison calculation unit 120 redefines the current state of the object by comparing the current content of the object (the current normal state and the value of the change item) and the content after request of the object (the normal state after request and the value of the change item), that is, redefines the current state of the object as the reinterpreted state defined for the current normal state in a case where only the value of the change item of each state is different, on the basis of the specified state element definition, upon receipt of the request state element. Here, the current state redefinition unit 121 may output the state obtained by changing the current state of the current state element to the reinterpreted state to the change request generation unit 122, as the current state element in the comparison with the request state element of this time.

The change request generation unit 122 of the state comparison calculation unit 120 generates an instruction state element on the basis of the current state element obtained as a result of the redefinition processing by the current state redefinition unit 121 and the received request state element. The change request generation unit 122 may output the generated instruction state element via the state element input/output unit 200. The change request generation unit 122 may output the corresponding state element definition together with the generated instruction state element, for example. Further, the change request generation unit 122 may generate and output an instruction state element conforming to the specifications of a processing procedure generation device or the like located at the output destination.

The state element input/output unit 200 outputs the accepted instruction state element. In the case where the state element input/output unit 200 is a display device, for example, the state element input/output unit 200 may display the instruction state element on the display device and presents the instruction state element to a user. Further, the state element input/output unit 200 may output the instruction state element to a predetermined processing procedure generation device connected via a network or the like. In a case where the state element input/output unit 200 further includes a processing execution unit, the state element input/output unit 200 can also transfer the instruction state element to the processing execution unit and cause the processing execution unit to generate the processing procedure.

[Description of Operation]

Figure 15:
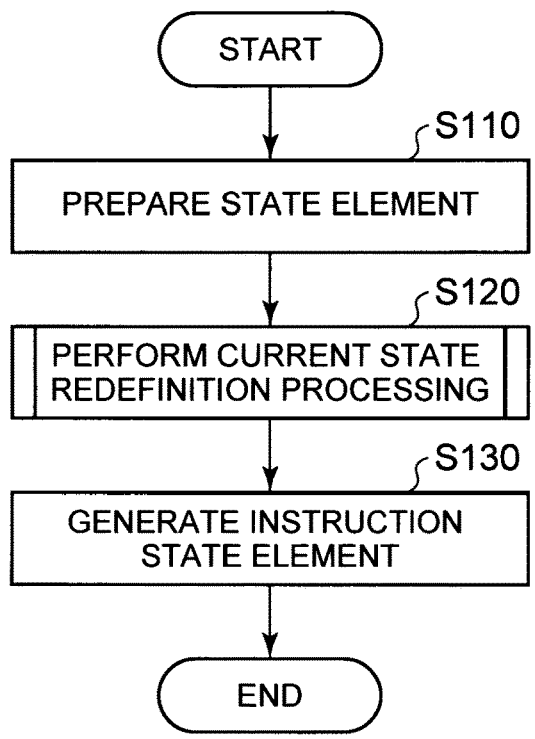
FIG. 15 It depicts a flowchart illustrating an example of a derivation flow of an instruction state element in a state management system 100.

Next, an operation of the present exemplary embodiment will be described. FIG. 15 is a flowchart illustrating an example of a processing flow of deriving the instruction state element in the present exemplary embodiment. Note that, in this example, assuming that the state element definition and the current state element corresponding to the current normal state, about a necessary object, are stored in the state element storage unit 110.

First, when receiving the request state element (or the state element after state change) of an arbitrary object from the state element input/output unit 200, the state comparison calculation unit 120 (more specifically, the current state redefinition unit 121) acquires the current state element with the same id as the received request state element, of the current state element stored in the state element storage unit 110 (step S110). At this time, the state comparison calculation unit 120 may also acquire the state element definition corresponding to the received request state element.

Next, the current state redefinition unit 121 compares the received request state element with the acquired current state element, and redefines the current state (step S120).

When the current state redefinition processing by the current state redefinition unit 121 is completed, the change request generation unit 122 generates an instruction state element on the basis of the received request state element and the current state element output from the current state redefinition unit 121 (step S130).

Figure 16:
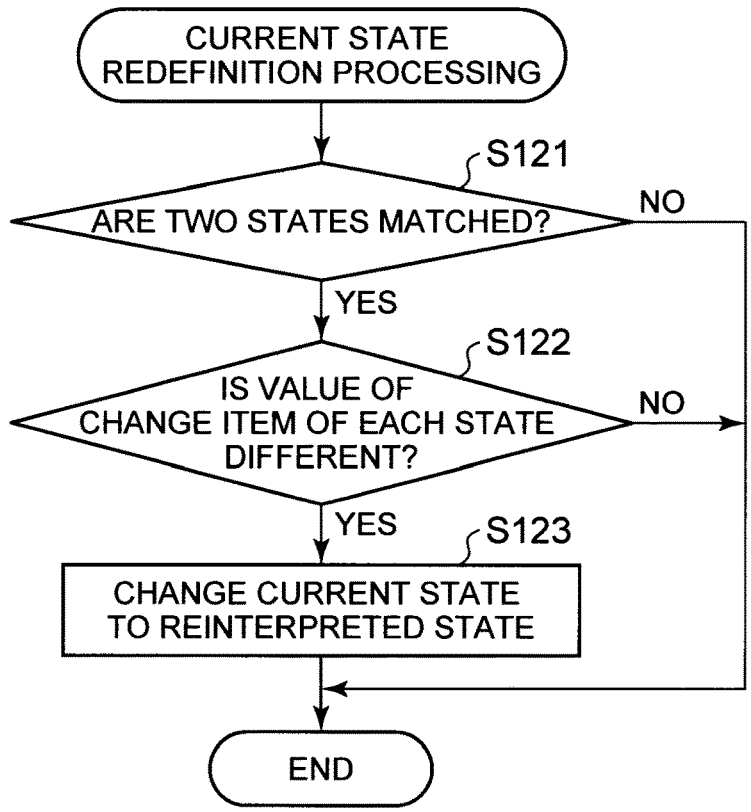
FIG. 16 It depicts a flowchart of comparison processing of a state comparison calculation unit 120.

Further, FIG. 16 is a flowchart illustrating an example of a processing flow of redefining the current state by the current state redefinition unit 121. In the example illustrated in FIG. 16, first, the current state redefinition unit 121 determines whether the request state and the current state are matched (step S121). Here, when the two states are not matched (No in step S121), the current state redefinition unit 121 does nothing for the acquired current state element, determining that redefinition of the current state is unnecessary, and outputs the current state element as it is.

On the other hand, when the two states are matched (Yes in step S121), the current state redefinition unit 121 determines whether the value of the change item is different before and after the state change (step S122). Here, when the value of the change item of each state is matched (No in step S122), the current state redefinition unit 121 does nothing for the acquired current state element, determining that redefinition of the current state is unnecessary, and outputs the current state element as it is.

On the other hand, when the value of the change item of each state is different (Yes in step S122), the current state redefinition unit 121 determines that redefinition of the current state is necessary and redefines the current state as the reinterpreted state corresponding to the current state (step S123). Here, the current state redefinition unit 121 copies the acquired current state element and outputs a state obtained by changing the current state to the reinterpreted state corresponding to the current state. Note that the redefinition of the current state can be performed on the instruction state element without being performed on the current state element. In that case, the current state redefinition unit 121 may just output the reinterpreted state corresponding to the current normal state as information indicating the current state when determining that the redefinition is necessary, and may just output the current normal state when determining that the redefinition is unnecessary.

In this case, the change request generation unit 122 may just generate the instruction information element, using the state of the received request state element as the request state and the current state output from the current state redefinition unit 121 as the current state. Note that, as for the value of the change item, the change request generation unit 122 may just set the value in the request state element.

Figures 17, 18:
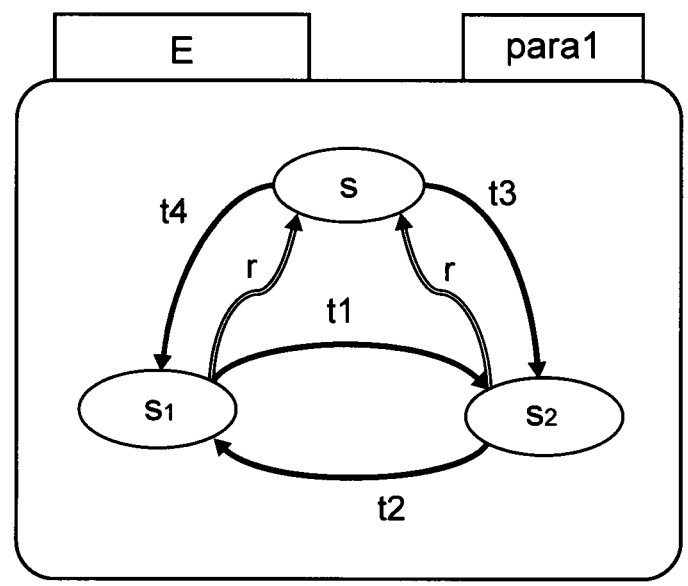
FIG. 17 It depicts a diagram illustrating an example of a current state element after redefinition.
FIG. 18 It depicts a diagram of a state element in which states of all of reinterpretation destinations in the state element are matched.

Hereinafter, the above operation will be specifically described using the above-described example. When receiving the request state element illustrated in FIG. 12 from the state element input/output unit 200, the state comparison calculation unit 120 (current state redefinition unit 121) acquires the state element definition (FIG. 8) of "Apache" managed with the id "apache1" and the current state element (FIG. 10), for example. Then, the state comparison calculation unit 120 (current state redefinition unit 121) compares the acquired current state element with the received request state element, and determines whether redefinition is necessary. In this example, it is determined that redefinition is necessary, and thus the state comparison calculation unit 120 (current state redefinition unit 121) generates and outputs a current state element as illustrated in FIG. 17 on the basis of the state element definition. The change request generation unit 122 generates an instruction state element on the basis of the output current state element and the received request state element. In this example, the instruction state element (FIG. 14) of the object "Apache" managed with id "apache1" is generated.

More specifically, when comparing the states of the current state elements illustrated in FIGS. 10 and 12, both of the states in the 5th line indicate "T". Next, when comparing the values of the change items, the value of "port" in the 7th row is "80" before the state change in FIGS. 10 and "81" after the state change in FIG. 12, and exhibit different values. Here, according to the state element definition illustrated in FIG. 8, it can be seen that reinterpretation occurs when the value of the change item is different in the state of "T" before and after the state change. Then, it can be seen that the reinterpreted state generated by reinterpretation is "U". Therefore, the current state redefinition unit 121 of the state comparison calculation unit 120 redefines the current state as "U".

Note that, when it is determined that redefinition is unnecessary as a result of the comparison, the state comparison calculation unit 120 (current state redefinition unit 121) may output the acquired current state element as it is. In this case as well, the change request generation unit 122 may just generate an instruction state element from the output current state element and the received request state element.

Further, the change request generation unit 122 may derive a change procedure on the basis of the instruction state element derived in step S130 and the state element definition. In the above example, a change procedure for executing "service apache2 reload" as reload processing after changing the port number of Apache to 81 is generated.

Further, the system change assistance system 10 may include a process execution unit, and the process execution unit may execute the generated change procedure.

Further, as the reinterpretation method, a method of performing redefinition such that all the normal states of the object are changed to the same state, a method of determining reinterpretation destinations in all of objects that configure the system, or the like is also possible, other than defining the reinterpretation destinations for normal states of a certain object.

FIG. 18 is a diagram illustrating an example of a state element definition in which all the normal states of a certain object are reinterpreted to the same state. Both the states "s1" and "s2" are defined to be transitioned to the state "s" by reinterpretation. Here, the state "s" may be a normal state. In that case, a transition from the state "s" to the state "s" by reinterpretation may just be defined.

FIG. 19 is a diagram expressing the state element definition illustrated in FIG. 18 in a text format. In this reinterpretation, all the states of the reinterpretation destinations are the same. Therefore, "*" indicating all states is specified in the "from" item in the "reinterpretation" item.

As described above, according to the present exemplary embodiment, even when a state transition based on the setting value is included in a state transition in a state element, sets of states and setting values are compared before and after state change, and the state before state change is reinterpreted and the current state is redefined, whereby reload processing of changing setting values without defining states of the number of the setting values can be derived.

Note that, in the above-described exemplary embodiment, the example of deriving the state transition and the change procedure based on change of the system, using the set of a state and a change item has been described. However, the object is not limited to the set of a state and a change item. That is, for sets of a first item having a discrete value in which the number of possible values is finite or less than a predetermined value, and a second item having a continuous value or a discrete value in which the number of possible values is equal to or larger than a predetermined value, a change procedure based on change of either the value of the first item or the value of the second item can be similarly derived. For example, the system change assistance system may compare the two vectors, one of which is set to a first comparison subject vector and the other is set to a second comparison subject vector, each configured from the value of the first item and the value of the second item, and change the value of the first item of the first comparison subject vector in a case where the value of the first item of each vector is matched and the value of the second item of each vector is different. In that case, the state management system 100 may be a value management system. Here, the first item corresponds to the state in the above exemplary embodiment. The second item corresponds to the change item in the above exemplary embodiment. In addition, the value of the change item may be, for example, a synthesis of values of a plurality of items holding a value having a change possibility.

Figure 20:
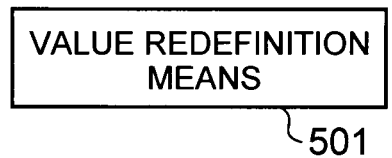
FIG. 20 It depicts a block diagram illustrating an outline of the present invention.

Next, an outline of the present invention will be described. FIG. 20 is a block diagram illustrating an outline of the present invention. As illustrated in FIG. 20, the system change assistance system according to the present invention includes value redefinition means 501.

The value redefinition means 501 (for example, the current state redefinition unit 121) compares two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and changes the value of the first item of the first comparison subject vector in a case where the value of the first item of each the vector is matched and the value of the second item of each the vector is different.

Note that, in the system change assistance system, the first comparison subject vector may be configured from the set of the value of the first item and the value of the second item before change of an object system, and the second comparison subject vector may be configured from the set of the value of the first item and the value of the second item after change of the object system.

Further, the first item may be a state of a component that configures an object system, and the second item may be an arbitrary item holding a value that is related to the component of the object system and has a change possibility.

In such a case, as a result of the comparison, a change state may be a specific state specified in advance. Further, as a result of the comparison, the change state may be a state specified for each type of components of the system constituting the first comparison subject vector. Furthermore, as a result of the comparison, the change state may differ depending on a value of the state of the vector before change.

Further, the value of the first item after change of the first comparison subject vector may be a predetermined value that is not taken by the first item in the object system.

Figure 21:
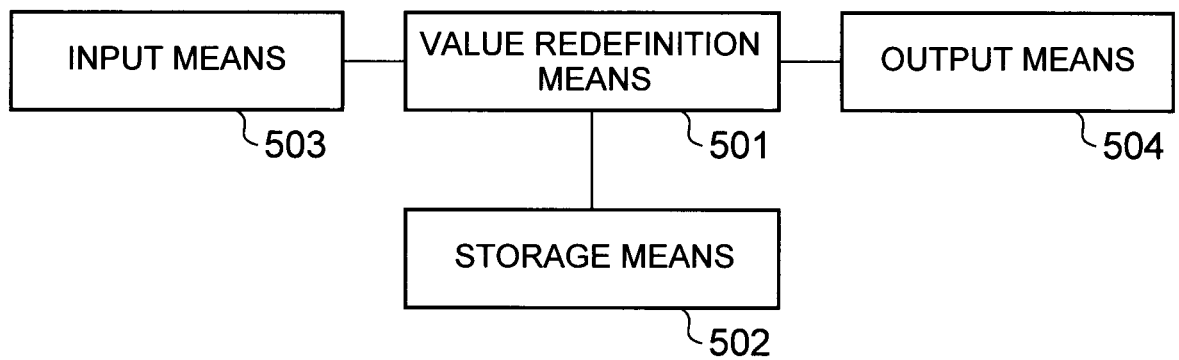
FIG. 21 It depicts a diagram illustrating another configuration example of a system change assistance system of the present invention.
Figure 22:
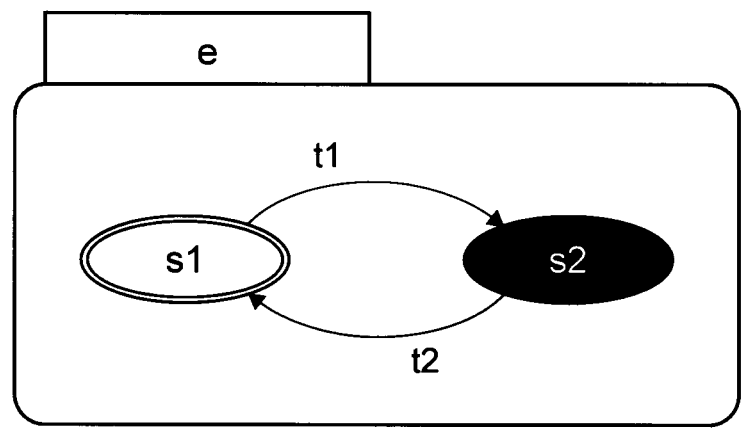
FIG. 22 It depicts a conceptual diagram of a state element.
Figure 23:
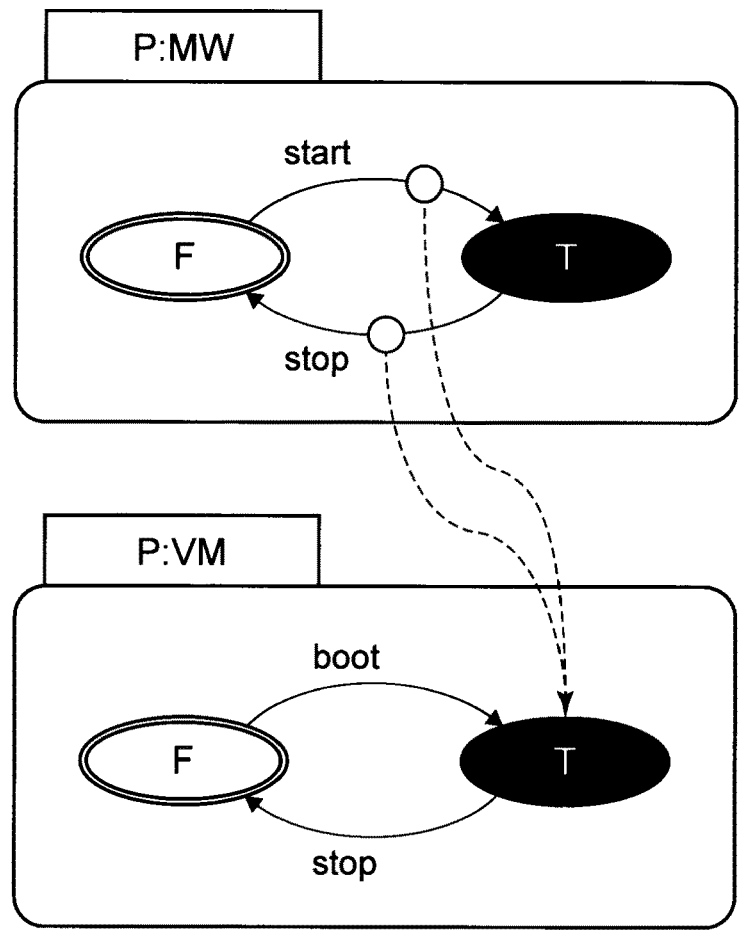
FIG. 23 It depicts a diagram illustrating an expression example of a change requirement of a system based on a plurality of state elements.
Figure 24:
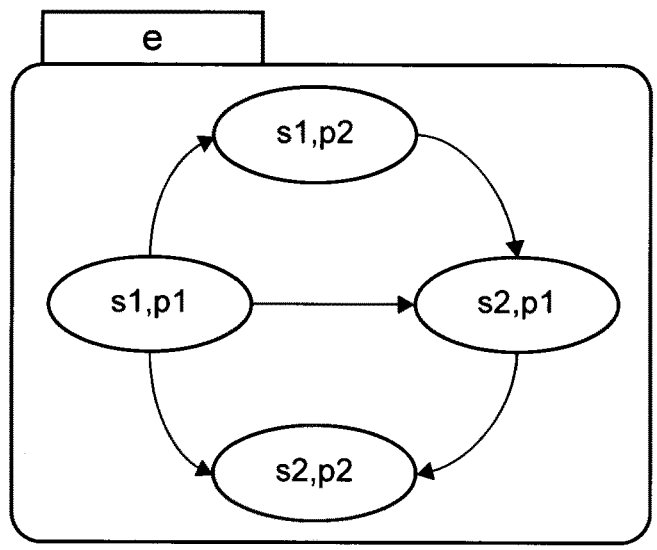
FIG. 24 It depicts a diagram illustrating an example of a state element in which a set of states and setting values is defined as the element state.

Further, FIG. 21 is a block diagram illustrating another configuration example of the system change assistance system according to the present invention. As illustrated in FIG. 21, the system change assistance system may further include storage means 502, input means 503, and output means 504.

The storage means 502 (for example, the state element storage unit 110) may be storage means that holds a change requirement in changing the value of the first item to a different value. Further, the storage means 502 may be storage means that holds the value of the first item after change in association with an identifier defined in advance for the first item before change or for the set of the first item and the second item that configure the first comparison subject vector. Note that the storage means 502 may be storage means for storing all of them.

The input means 503 (for example, the state element input/output unit 200) inputs information including the second comparison subject vector. The output means 504 (for example, the state element input/output unit 200) outputs information including the first comparison subject vector after change.

Further, the storage means 502 may be system component state storage means for storing information of components of the system before change. Further, the input means 503 may be state element input means for receiving information of components of the system after change. In such a case, the value redefinition means 501 may be means for comparing the information of components of the system before change stored in the storage means 502 with the information of components of the system after change input by the input means 503, and redefining the information of components of the system. Further, the output means 504 may be output means for outputting information of components of the redefined system.

The invention of the present application has been described with reference to the exemplary embodiments and examples. However, the invention of the present application is not limited by the exemplary embodiments and examples above. Various changes understandable by a person skilled in the art can be made to the configurations and details of the invention of the present application within the scope of the invention of the present application.

The present invention is based on and claims the benefits of priority from the Japanese Patent Application No. 2015-167796, filed on Aug. 27, 2015, the entire contents of which are incorporated herein by reference.

INDUSTRIAL APPLICABILITY

The present invention is favorably applicable to a system in which a system component has a first item having a discrete value in which the number of possible values is finite or less than a predetermined value, and a second item having a continuous value or a discrete value in which the number of possible values is equal to or larger than a predetermined value.

REFERENCE SIGNS LIST

10 System change assistance system
100 State management system
110 State element storage unit
120 State comparison calculation unit
121 Current state redefinition unit
122 Change request generation unit
200 State element input/output unit
501 Value redefinition means
502 Storage means
503 Input means
504 Output means

What is claimed is:

1. A system change assistance system comprising:
a value redefinition unit implemented at least by a hardware including a processor and configured to compare two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and to change the value of the first item of the first comparison subject vector in a case where the value of the first item of each vector is matched and the value of the second item of each vector is different.

2. The system change assistance system according to claim 1, wherein the first comparison subject vector is configured from the set of the value of the first item and the value of the second item before change of an object system, and the second comparison subject vector is configured from the set of the value of the first item and the value of the second item after change of the object system.

3. The system change assistance system according to claim 1, further comprising:
a storage unit implemented at least by the hardware and configured to hold a change requirement in changing the value of the first item to a different value.

4. The system change assistance system according to claim 1, wherein the first item is a state of a component that configures an object system, and the second item is an arbitrary item holding a value that is related to the component of the object system and has a change possibility.

5. The system change assistance system according to claim 1, wherein the value of the first item after change of the first comparison subject vector is a predetermined value that is not taken by the first item in an object system.

6. The system change assistance system according to claim 1, further comprising:
a storage unit implemented at least by the hardware and configured to hold the value of the first item after change in association with an identifier defined in advance for the first item before change or for the set of the first item and the second item that configure the first comparison subject vector.

7. The system change assistance system according to claim 1, further comprising:
an input unit implemented at least by the hardware and configured to input information including the second comparison subject vector; and
an output unit implemented at least by the hardware and configured to output information including the first comparison subject vector after change.

8. A system change assistance method comprising:
by an information processing device, comparing two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and changing the value of the first item of the first comparison subject vector in a case where the value of the first item of each vector is matched and the value of the second item of each vector is different.

9. A non-transitory computer readable recording medium in which a system change assistance program is recorded, the system change assistance program for causing a computer to execute processing of:
comparing two vectors, one of which is set to a first comparison subject vector and the other is set to a second comparison subject vector, each configured from a set of a value of a first item having a discrete value in which the number of possible values is finite or less than a predetermined value, and a value of a second item having a continuous value or a discrete value in which the number of possible values is equal to or larger than a predetermined value, and changing the value of the first item of the first comparison subject vector in a case where the value of the first item of each vector is matched and the value of the second item of each vector is different.

* * * * *